United States Patent
Chen et al.

(10) Patent No.: US 12,320,670 B2
(45) Date of Patent: Jun. 3, 2025

(54) DYNAMIC CALIBRATION SYSTEM AND DYNAMIC CALIBRATION METHOD FOR HETEROGENEOUS SENSORS

(71) Applicant: Industrial Technology Research Institute, Hsinchu (TW)

(72) Inventors: Po-Wei Chen, Hsinchu County (TW); Chi-Hung Wang, Tainan (TW); Che-Jui Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 387 days.

(21) Appl. No.: 18/154,000

(22) Filed: Jan. 12, 2023

(65) Prior Publication Data
US 2024/0142270 A1    May 2, 2024

(30) Foreign Application Priority Data
Oct. 31, 2022  (TW) .................................. 111141400

(51) Int. Cl.
*G01C 25/00* (2006.01)
(52) U.S. Cl.
CPC .................... *G01C 25/00* (2013.01)
(58) Field of Classification Search
CPC ................................................. G01C 25/00
See application file for complete search history.

(56) References Cited

U.S. PATENT DOCUMENTS

| 9,406,145 B2 | 8/2016 | Gammenthaler et al. |
| 9,872,010 B2 | 1/2018 | Tran et al. |
| 10,907,960 B1 | 2/2021 | Bravo Orellana |

(Continued)

FOREIGN PATENT DOCUMENTS

| CN | 107036630 | 8/2017 |
| CN | 114022830 | 2/2022 |

(Continued)

OTHER PUBLICATIONS

"Office Action of Taiwan Counterpart Application", issued on May 24, 2023, p. 1-p. 12.

(Continued)

*Primary Examiner* — Walter L Lindsay, Jr.
*Assistant Examiner* — Andrew V Do
(74) *Attorney, Agent, or Firm* — JCIPRNET

(57) ABSTRACT

A dynamic calibration method for heterogeneous sensors includes: sensing dynamic objects by a first sensor to generate first sensing data; sensing the dynamic objects by a second sensor to generate second sensing data; performing feature matching between the first sensing data and the second sensing data to determine first valid data and second valid data, and identifying a tracked object from the dynamic objects based on the first valid data and the second valid data; performing feature comparison between the first valid data and the second valid data corresponding to the tracked object to calculate data errors between the first sensor and the second sensor; and calculating a calibration parameter based on the first valid data and the second valid data when the number of the data errors exceeds an error threshold, and adjusting the first sensing data and the second sensing data based on the calibration parameter.

20 Claims, 9 Drawing Sheets

(56) References Cited

U.S. PATENT DOCUMENTS

| | | | |
|---|---|---|---|
| 2018/0300898 A1* | 10/2018 | Eshima | H04N 17/002 |
| 2019/0120934 A1 | 4/2019 | Slutsky et al. | |
| 2020/0200870 A1 | 6/2020 | Nemati et al. | |
| 2020/0301013 A1 | 9/2020 | Banerjee et al. | |
| 2022/0114458 A1 | 4/2022 | Elli et al. | |

FOREIGN PATENT DOCUMENTS

| | | |
|---|---|---|
| CN | 114902070 | 8/2022 |
| TW | 201116431 | 5/2011 |
| TW | 202012222 | 4/2020 |
| TW | I734648 | 7/2021 |
| TW | M614686 | 7/2021 |
| TW | I747195 | 11/2021 |

OTHER PUBLICATIONS

Kudong LV et al., "LCCNet: LiDAR and Camera Self-Calibration using Cost Volume Network", 2021 IEEE/CVF Conference on Computer Vision and Pattern Recognition Workshops (CVPRW), Jun. 19-25, 2021, pp. 1-8.

Jingjing Jiang et al., "Line Feature Based Extrinsic Calibration of LiDAR and Camera", 2018 IEEE International Conference on Vehicular Electronics and Safety (ICVES), Sep. 12-14, 2018, pp. 1-6.

Shan Wu et al., "NetCalib: A Novel Approach for LiDAR-Camera Auto-calibration Based on Deep Learning", 2020 25th International Conference on Pattern Recognition (ICPR), Jan. 10-15, 2021, pp. 6648-6655.

Christoph Schöller et al., "Targetless Rotational Auto-Calibration of Radar and Camera for Intelligent Transportation Systems", 2019 IEEE Intelligent Transportation Systems Conference (ITSC), Oct. 27-30, 2019, pp. 3934-3941.

Xiao Luo et al., "Unified calibration method for millimeter-wave radar and camera", Journal of Tsinghua University (Science and Technology), vol. 54, No. 3, 2014, with English abstract, pp. 1-6.

Niu Ping-Juan et al., abstract of "Joint calibration method of millimeter wave radar and vision sensor based on neural network", Journal of Tiangong University, vol. 38, No. 5, Oct. 2019, pp. 1-1.

Qingquan Feng et al., "Radar-vision fusion for correcting the position of target vehicles", 2018 10th International Conference on Intelligent Human-Machine Systems and Cybernetics, Aug. 25-26, 2018, pp. 352-355.

* cited by examiner

DYNAMIC CALIBRATION SYSTEM AND DYNAMIC CALIBRATION METHOD FOR HETEROGENEOUS SENSORS

CROSS-REFERENCE TO RELATED APPLICATION

This application claims the priority benefit of Taiwan application serial no. 111141400, filed on Oct. 31, 2022. The entirety of the above-mentioned patent application is hereby incorporated by reference herein and made a part of this specification.

TECHNICAL FIELD

The technical field relates to a dynamic calibration technology for heterogeneous sensors, and in particular to a dynamic calibration system and a dynamic calibration method for heterogeneous sensors.

BACKGROUND

A vehicle senses through heterogeneous sensors, and the heterogeneous sensors may provide assistance in image detection while the vehicle runs and deal with conditions with poor vision such as heavy rain, heavy fog, backlighting, and insufficient light at night, thereby improving accuracy or reducing misjudgments. However, when a sensing device is loosened due to an external force, an obstacle that is detected may not be displayed in a correct position, causing wrong decisions and resulting in accidents.

Furthermore, the existing sensor calibration procedure need to be completed by a professional technician in a repair shop through static calibration. The verification procedure is cumbersome and lengthy, and only a small number of measurement positions can be verified with a static object to be tested to define the sensor calibration accuracy, and the verification error coverage rate is poor. In addition, since the calibration parameter cannot be dynamically adjusted after the static calibration is completed, erroneous detection is likely to occur due to the interference of the external environment.

Therefore, how to adjust sensing data during driving in real time when the sensitivity of at least one of the heterogeneous sensors deviates is an urgent problem to be overcome. When the sensor is inaccurate, the vehicle does not need to return to the repair shop for static calibration, which saves time, manpower, and maintenance costs, and improves the safety of the vehicle during driving.

SUMMARY

One of exemplary embodiments of the disclosure provides a dynamic calibration system for heterogeneous sensors, including a first sensor, a second sensor, and a processor. The first sensor is configured to sense at least one dynamic object to generate multiple pieces of first sensing data. The second sensor is configured to sense the at least one dynamic object to generate multiple pieces of second sensing data. The processor is coupled to the first sensor and the second sensor. The processor is configured to execute the following. The processor performs feature matching between the first sensing data and the second sensing data to determine at least one piece of first valid data and at least one piece of second valid data, and identifies a tracked object from the at least one dynamic object according to the at least one piece of first valid data and the at least one piece of second valid data. The processor performs feature comparison between the at least one piece of first valid data and the at least one piece of second valid data associated with the tracked object to calculate data errors between the first sensor and the second sensor. In response to the number of the data errors exceeding an error threshold, the processor calculates a calibration parameter according to the at least one piece of first valid data and the at least one piece of second valid data, and adjusts the first sensing data and the second sensing data based on the calibration parameter.

One of exemplary embodiments of the disclosure also provides a dynamic calibration method for heterogeneous sensors, including the following. At least one dynamic object is sensed by a first sensor to generate multiple pieces of first sensing data. The at least one dynamic object is sensed by a second sensor to generate multiple pieces of second sensing data. Feature matching is performed between the first sensing data and the second sensing data to determine at least one piece of first valid data and at least one piece of second valid data, and a tracked object is identified from the at least one dynamic object according to the at least one piece of first valid data and the at least one piece of second valid data. Feature comparison is performed between the at least one piece of first valid data and the at least one piece of second valid data associated with the tracked object to calculate data errors between the first sensor and the second sensor. In response to the number of the data errors exceeding an error threshold, a calibration parameter is calculated according to the at least one piece of first valid data and the at least one piece of second valid data, and the first sensing data and the second sensing data are adjusted based on the calibration parameter.

Based on the above, the dynamic calibration system for heterogeneous sensors and the dynamic calibration method for heterogeneous sensors described in this disclosure adjust sensing data in real time during driving when it is determined that at least one of the heterogeneous sensors has a deviation in sensitivity. When the sensor is inaccurate, the vehicle does not need to return to a repair shop for static calibration, which saves time, manpower, and maintenance costs, and improves the safety of the vehicle during driving.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
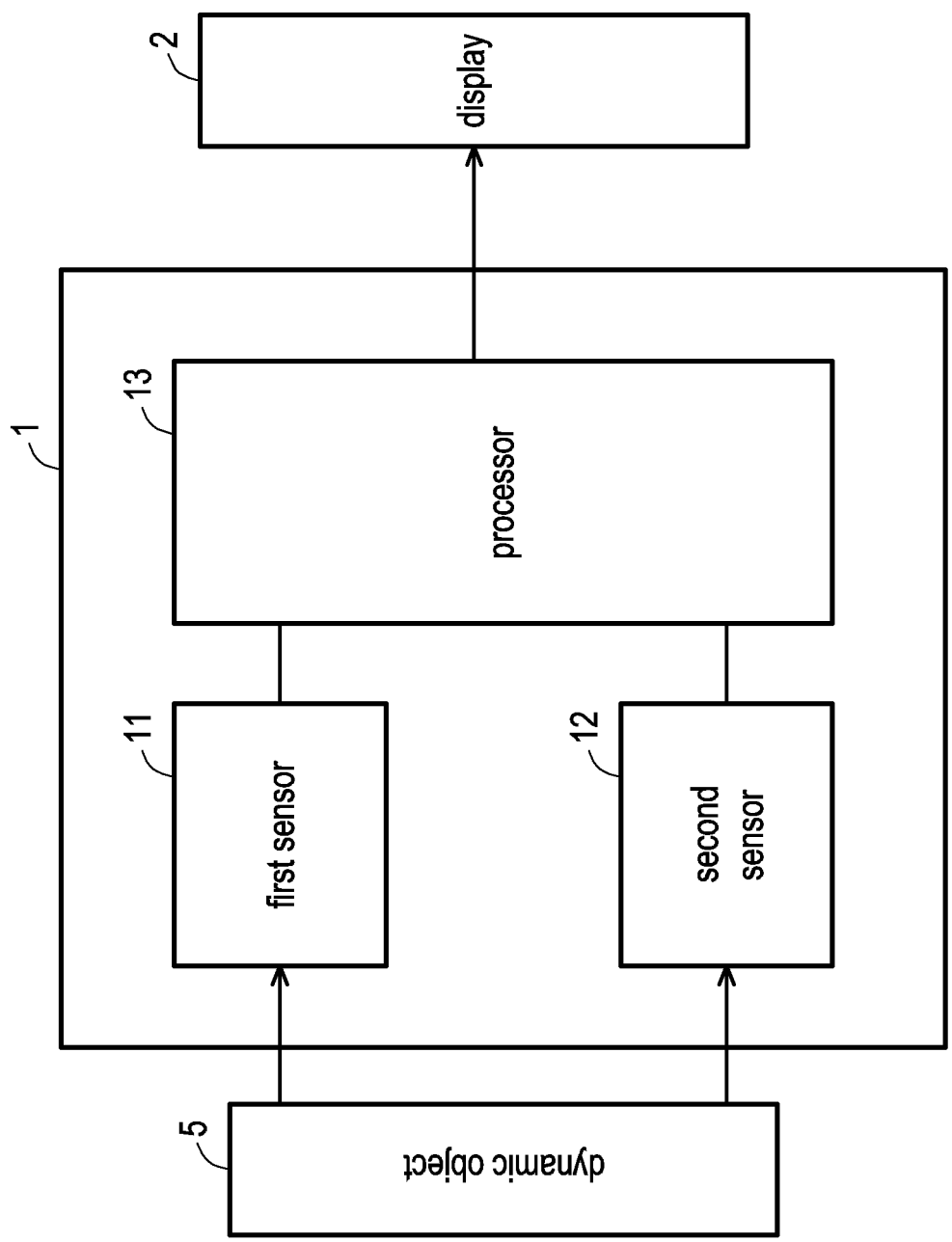
FIG. 1 is a structural diagram illustrating a dynamic calibration system for heterogeneous sensors according to an embodiment of the disclosure.

Several embodiments of the disclosure accompanied by drawings are described in detail below. For reference numerals referred to in the following description, when the same reference numerals are shown in different drawings, those same reference numerals will be regarded as the same or similar elements. These embodiments are a part of the disclosure and do not disclose all possible implementations of the disclosure.

FIG. 1 is a structural diagram illustrating a dynamic calibration system 1 for heterogeneous sensors according to an embodiment of the disclosure. With reference to FIG. 1, the dynamic calibration system 1 for heterogeneous sensors includes a first sensor 11, a second sensor 12 and a processor 13. The first sensor 11 is configured to sense at least one dynamic object 5 to generate multiple pieces of first sensing data. The second sensor 12 is configured to sense the at least one dynamic object 5 to generate multiple pieces of second sensing data. The processor 13 is coupled to the first sensor 11 and the second sensor 12.

In one embodiment, the first sensor 11 may be an image sensor or an optical sensor, and similarly, the second sensor 12 may also be an image sensor or an optical sensor. Practically speaking, when the first sensor or the second sensor is an image sensor, the first sensor or the second sensor may be a sensor capable of sensing images of the dynamic objects 5, such as a camera, a thermal imager, and a night vision device. However, the disclosure is not limited thereto. When the first sensor or the second sensor is an optical sensor, the first sensor or the second sensor may be a sensor sensing the dynamic objects 5 by optical sensing, such as radar and lidar. However, the disclosure is not limited thereto. The processor 13 may be a central processing unit (CPU), a micro-processor or an embedded controller. The disclosure is not additionally limited thereto.

In one embodiment, the dynamic calibration system 1 for heterogeneous sensors may be additionally connected to a display 2, for example, an electronic device having a display function, such as a display, a tablet computer, or a personal computer. The first sensor 11 and the second sensor 12 generate the first sensing data and the second sensing data after sensing the dynamic objects 5 respectively. The processor 13 may convert the first sensing data and the second sensing data into an image signal and transmit the image signal to the display 2. The image signal displays an image corresponding to the first sensing data and the second sensing data through the display 2 for users to watch.

Figure 2:
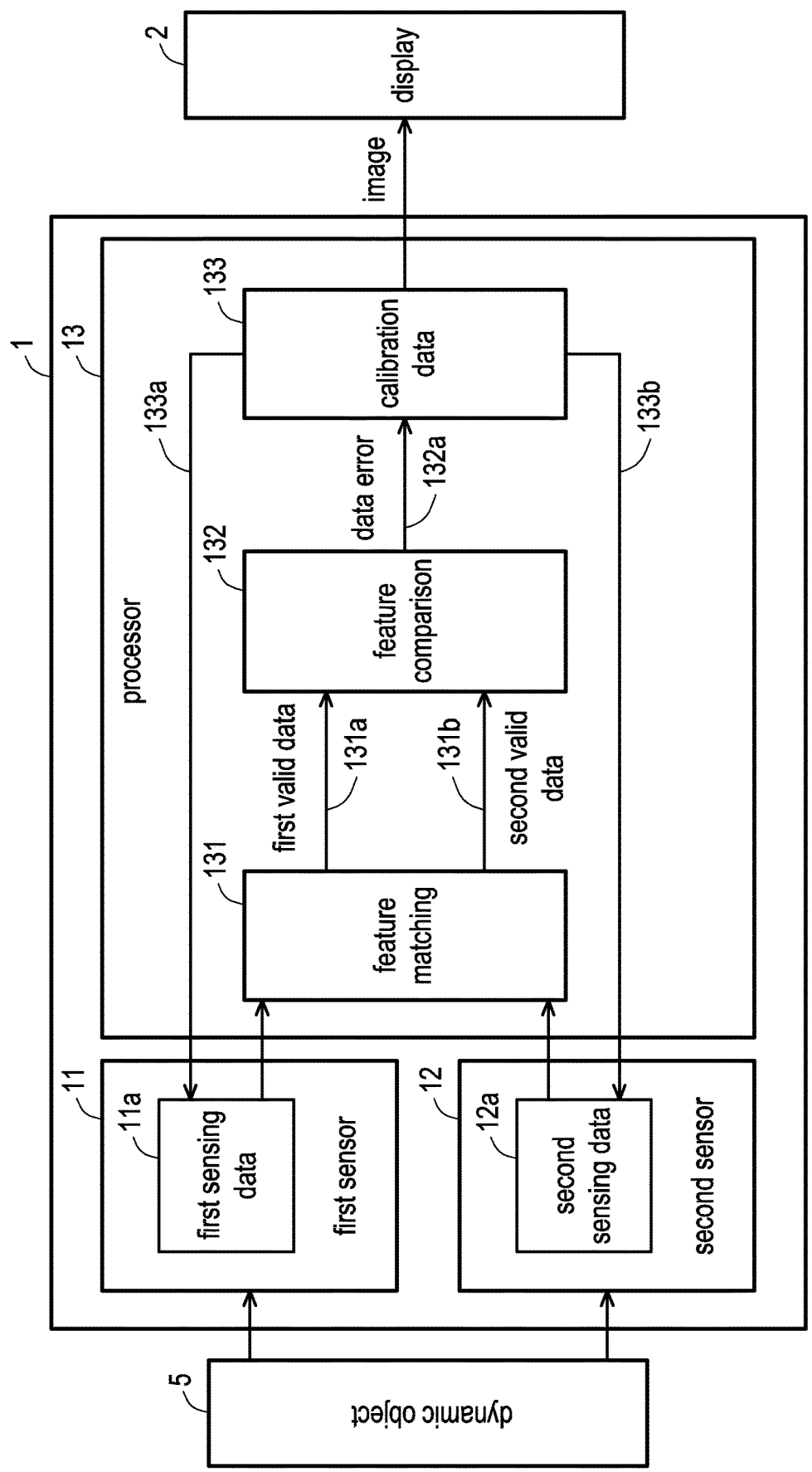
FIG. 2 is a schematic diagram illustrating a dynamic calibration system for heterogeneous sensors according to an embodiment of the disclosure.

FIG. 2 is a schematic diagram illustrating a dynamic calibration system 1 for heterogeneous sensors according to an embodiment of the disclosure. The first sensor 11 senses at least one sensing dynamic object 5 to generate multiple pieces of first sensing data 11a, and the second sensor 12 senses the at least one sensing dynamic object 5 to generate multiple pieces of second sensing data 12a. For example, the dynamic calibration system 1 for heterogeneous sensors may be installed on a vehicle, such as on a sensing system for a vehicle, and senses the dynamic objects 5 (i.e., vehicles moving ahead of the road) by the first sensor 11 and the second sensor 12 that are heterogeneous. The first sensor 11 and the second sensor 12 simultaneously sense the vehicles moving ahead of the road and generate the first sensing data 11a and the second sensing data 12a associated with each vehicle. In particular, when a sensor (the first sensor 11 or the second sensor 12) is an image sensor, sensing data generated (the first sensing data 11a and the second sensing data 12a) is an image associated with the vehicle; when a sensor (the first sensor 11 or the second sensor 12) is an optical sensor, sensing data generated (the first sensing data 11a and the second sensing data 12a) is associated with light received by the sensor and reflected from the vehicle.

If the first sensor 11 and/or the second sensor 12 are out of alignment due to some reasons (for example, no recalibration for a long time, dust attached, impacted, raindrops attached), it may cause the first sensor 11 and the second sensor 12 to misjudge a dynamic object (a tracked object) that is same as a different dynamic object. When the dynamic object is misjudged as the different dynamic object and the first sensor 11 and/or the second sensor 12 cannot be corrected immediately, the dynamic calibration system 1 for heterogeneous sensors described in the disclosure may identify that the first sensor 11 and the second sensor 12 are actually sensing the same tracked object according to sensing data sensed by the first sensor 11 and the second sensor 12. It will be described next how the dynamic calibration system 1 for heterogeneous sensors described in the disclosure identifies that the first sensor 11 and the second sensor 12 are actually sensing the same tracked object according to sensing data sensed by the first sensor 11 and the second sensor 12.

The processor 13 performs feature matching 131 between the first sensing data 11a and the second sensing data 12a to determine at least one piece of first valid data 131a and at least one piece of second valid data 131b, and identifies a tracked object from the at least one dynamic object 5 according to the at least one piece of first valid data 131a and the at least one piece of second valid data 131b.

Figure 3:
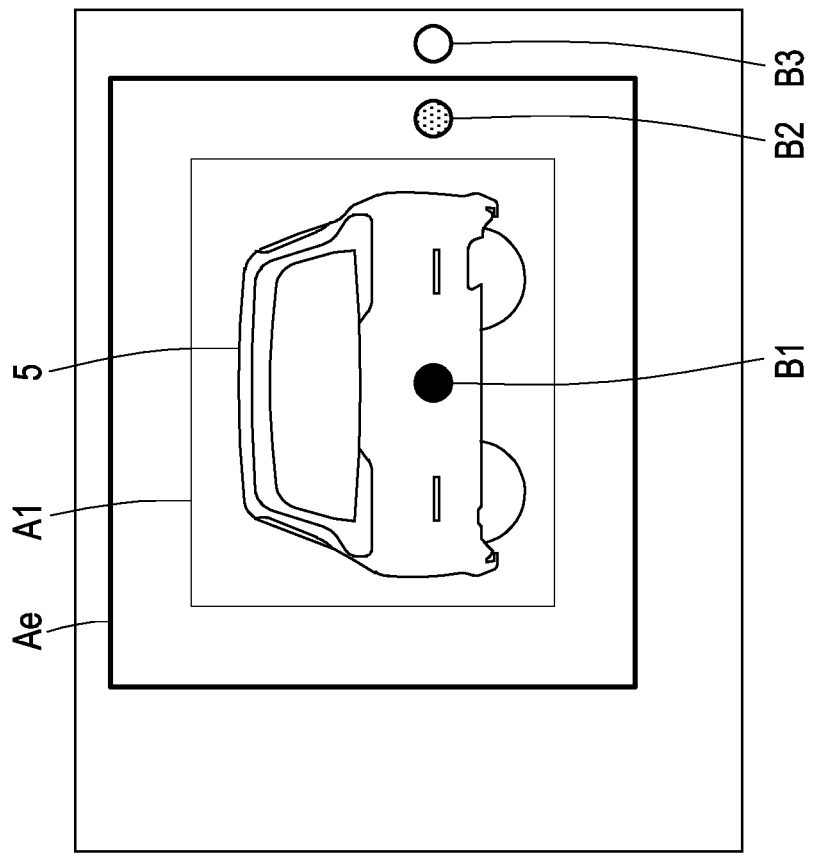
FIG. 3 is a schematic diagram illustrating a dynamic calibration system for heterogeneous sensors performing feature matching according to an embodiment of the disclosure.
Figure 3:
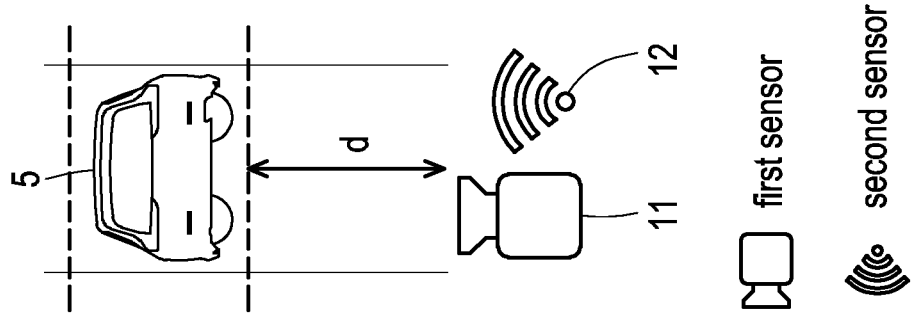

FIG. 3 is a schematic diagram illustrating a dynamic calibration system for heterogeneous sensors performing feature matching according to an embodiment of the disclosure. Next, with reference to FIGS. 2 and 3 at the same time. There may be multiple dynamic objects 5 simultaneously sensed by the first sensor 11 and the second sensor 12, and for the convenience of description, only one dynamic object 5 is illustrated in FIG. 3. When the first sensor 11 is an image sensor (for example, a camera) and the second sensor 12 is an optical sensor (for example, radar), and when the first sensor 11 and the second sensor 12 are at a distance d from the dynamic object 5, the first sensor 11 and the second sensor 12 continuously sense the dynamic object 5.

When the first sensor 11 senses the dynamic object 5, the first sensor 11 obtains an object frame A1 of the dynamic object 5. After the first sensor 11 obtains the object frame A1 of the dynamic object 5, the first sensor 11 generates the first sensing data corresponding to the object frame A1.

In addition, when the second sensor 12 senses the dynamic object 5, the second sensor 12 obtains at least one sensing point of the dynamic object 5 such as a sensing point B1, a sensing point B2, and a sensing point B3, and generates the second sensing data corresponding to the sensing points such as the sensing point B1, the sensing point B2, and the sensing point B3 of the dynamic object 5.

Next, the processor 13 performs the feature matching 131 between the aforementioned first sensing data corresponding to the object frame A1 and the second sensing data corresponding to the sensing points such as the sensing point B1, the sensing point B2, and the sensing point B3. When the processor 13 performs the feature matching 131 between the aforementioned first sensing data corresponding to the object frame A1 and the second sensing data corresponding to the sensing points such as the sensing point B1, the sensing point B2, and the sensing point B3, the processor 13 determines a relative position between the sensing points such as the sensing point B1, the sensing point B2, and the sensing point B3 and the object frame A1. When at least one of the sensing points such as the sensing point B1, the sensing point B2, and the sensing point B3 (for example, the sensing point B1) is located inside the object frame A1, the processor 13 determines that the object frame A1 is a valid object frame, and determines that the sensing point B1 is a candidate sensing point.

If the sensing points such as the sensing point B1, the sensing point B2, and the sensing point B3 are all located outside the object frame A1, then the first sensor 11 may expand the object frame A1 into an object frame Ae according to a size of the dynamic object 5 so as to find at least one candidate sensing point. A degree of expansion (for example, 10%) from the object frame A1 to the object frame Ae may be set by a user. In one embodiment, the first sensor 11 may also directly obtain the object frame Ae expanded according to the size of the dynamic object 5 and generate the first sensing data corresponding to the object frame A1.

When the processor 13 performs the feature matching 131 between the aforementioned first sensing data corresponding to the object frame Ae and the second sensing data corresponding to the sensing points such as the sensing point B1, the sensing point B2, and the sensing point B3, the processor 13 determines a relative position between the sensing points such as the sensing point B1, the sensing point B2, and the sensing point B3 and the object frame Ae. When at least one of the sensing points such as the sensing point B1, the sensing point B2, and the sensing point B3 (for example, the sensing point B1 and the sensing point B2) is located inside the object frame Ae, the processor 13 determines that the object frame Ae is a valid object frame, and determines that the sensing point B1 and the sensing point B2 are candidate sensing points.

Next, when the processor 13 determines that the object frame Ae is the valid object frame, and determines that the sensing point B1 and the sensing point B2 are the candidate sensing points, the processor 13 respectively calculates a distance between the candidate sensing points such as the sensing point B1 and the sensing point B2 and the valid object frame Ae. In FIG. 3, the distance between the sensing point B2 and the valid object frame Ae is much smaller than the distance between the sensing point B1 and the valid object frame Ae. That is, the sensing point B2 is the candidate sensing point closest to the valid object frame Ae. The processor 13 sets the candidate sensing point B2 corresponding to the one with the smallest distance as a valid sensing point. The processor 13 sets the first sensing data 11*a* corresponding to the valid object frame Ae as the first valid data 131*a* according to the valid object frame Ae, and sets the second sensing data 12*a* corresponding to the valid sensing point B2 as the second valid data 131*b*. Then, the processor 13 identifies a tracked object from the dynamic objects according to the first valid data 131*a* and the second valid data 131*b*.

Figure 4:
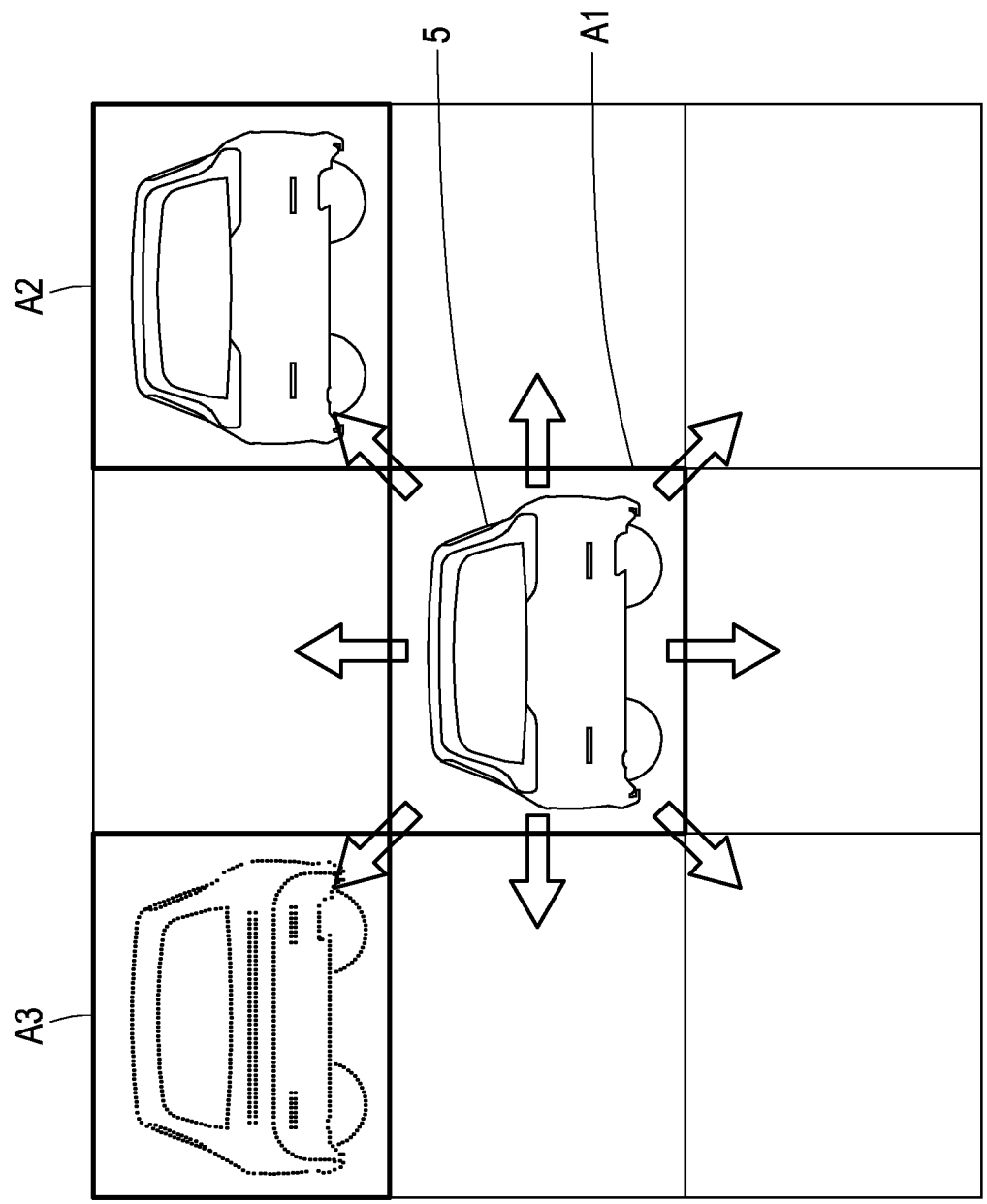
FIG. 4 is a schematic diagram illustrating a dynamic calibration system for heterogeneous sensors performing feature matching according to another embodiment of the disclosure.

FIG. 4 is a schematic diagram illustrating a dynamic calibration system for heterogeneous sensors performing feature matching according to another embodiment of the disclosure. Next, with reference to FIGS. 2 and 4 at the same time. The first sensor 11 and the second sensor 12 may sense multiple dynamic objects 5 at the same time. When the first sensor 11 is an image sensor (for example, a camera) and the second sensor 12 is also an image sensor (for example, a thermal imager, a night vision device, camera), and when the first sensor 11 and the second sensor 12 are at a distance d from any one of the dynamic objects, the first sensor 11 and the second sensor 12 continuously sense the dynamic object.

When the first sensor 11 senses the multiple dynamic objects, the first sensor 11 obtains the object frame A1 of one of the dynamic objects 5. After the first sensor 11 obtains the object frame A1 of the dynamic object 5, the first sensor 11 generates the first sensing data corresponding to the object frame A1.

In addition, when the second sensor 12 senses the multiple dynamic objects, the second sensor 12 obtains a second object frame of each of the multiple dynamic objects, such as a second object frame A1 and a second object frame A2, and generates the second sensing data corresponding to the second object frame A1 and the second object frame A2.

Next, the processor 13 performs the feature matching 131 between the aforementioned first sensing data corresponding to the object frame A1 and the second sensing data corresponding to the second object frames such as the second object frame A2 and a second object frame A3. In particular, the second object frames such as the second object frame A2 and the second object frame A3 are located in an adjacent position that expand outward from the center of the object frame A1. When the processor 13 performs the feature matching 131 between the first sensing data and the second sensing data, the processor 13 executes a comparison algorithm to compare similarity between the dynamic object 5 in the object frame A1 and the dynamic objects in the second object frame A2 and the second object frame A3.

In one embodiment, the processor 13 may convert the dynamic objects in the object frame A1, the second object frame A2, and the second object frame A3 into a feature value, such as an optical flow value, a motion vector, a colour feature value, geometric feature value, then, the processor 13 executes the comparison algorithm according to the feature value to compare the similarity between the dynamic object 5 in the object frame A1 and the dynamic objects in the second object frame A2 and the second object frame A3. The comparison algorithm may be, for example, a cross correlation algorithm, a Hungarian algorithm, a machine learning algorithm, a deep learning algorithm.

When the similarity is greater than a similarity threshold, the processor 13 determines that the dynamic object 5 in the object frame A1 is the same as the dynamic object in the second object frame A2 or the second object frame A3. For example, the processor 13 calculates that the similarity between the dynamic object 5 in the object frame A1 and the dynamic object in the second object frame A2 is greater than the similarity threshold, it represents that it may be confirmed that dynamic object 5 in the object frame A1 and the dynamic object in the second object frame A2 are the same dynamic object. On the contrary, for example, the processor 13 calculates that the similarity between the dynamic object 5 in the object frame A1 and the dynamic object in the second object frame A3 is not greater than the similarity threshold, it represents that it may be confirmed that the dynamic object 5 in the object frame A1 and the dynamic object in the second object frame A3 are not the same dynamic object. In one embodiment, when the similarity is greater than the similarity threshold, the processor 13 sets the object frame A1 and the second object frame A2 to the same tracking number.

Next, the processor 13 sets the first sensing data 11a corresponding to the object frame A1 as the first valid data 131a according to the object frame A1, and sets the second sensing data 12a corresponding to the second object frame A3 as the second valid data 131b according to the second object frame A3. Then, the processor 13 identifies the tracked object from the multiple dynamic objects according to the first valid data 131a and the second valid data 131b.

After the processor 13 identifies the tracked object, the processor 13 performs feature comparison 132 between the first valid data 131a and the second valid data 131b associated with the tracked object to calculate data errors 132a between the first sensor 11 and the second sensor 12.

Figure 5:
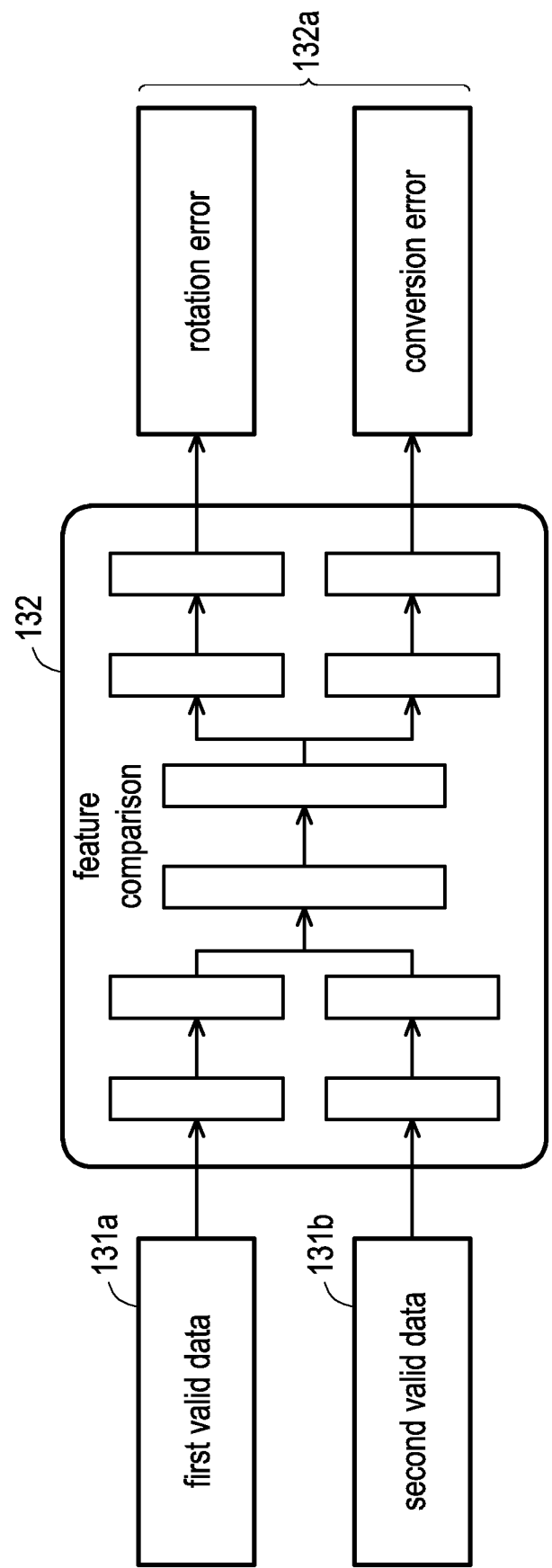
FIG. 5 is a schematic diagram illustrating a dynamic calibration system for heterogeneous sensors performing feature comparison according to an embodiment of the disclosure.

FIG. 5 is a schematic diagram illustrating a dynamic calibration system for heterogeneous sensors performing feature comparison according to an embodiment of the disclosure. With reference to FIG. 5, the processor 13 adopts a deep learning method (for example, Convolutional Neural Network, CNN) to perform the feature comparison 132 between the first valid data 131a and the second valid data 131b associated with the tracked object. After performing the feature comparison 132, the processor 13 calculates the data errors 132a between the first sensor 11 and the second sensor 12, and the data errors 132a may include, for example, a rotation error and a conversion error.

Figure 6:
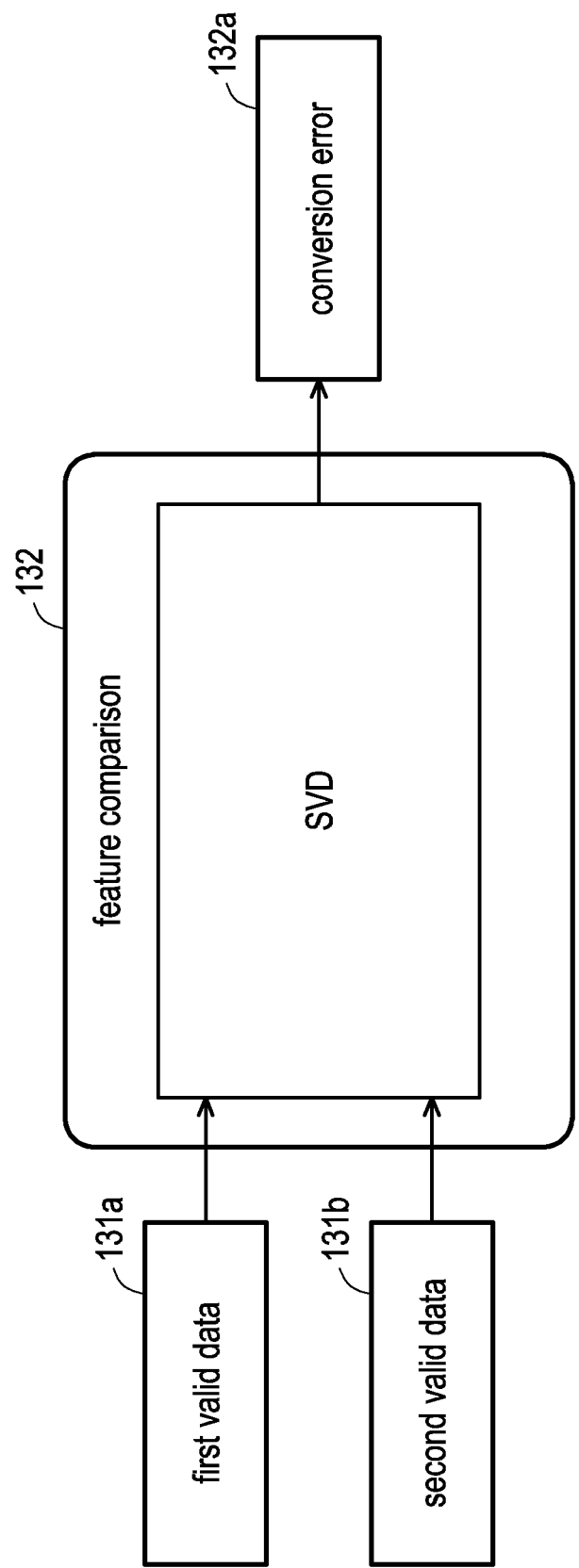
FIG. 6 is a schematic diagram illustrating a dynamic calibration system for heterogeneous sensors performing feature comparison according to another embodiment of the disclosure.

FIG. 6 is a schematic diagram illustrating a dynamic calibration system for heterogeneous sensors performing feature comparison according to another embodiment of the disclosure. With reference to FIG. 6, the processor 13 adopts a singular value decomposition (SVD) method to perform the feature comparison 132 between the first valid data 131a and the second valid data 131b associated with the tracked object. After performing the feature comparison 132, the processor 13 calculates the data errors 132a between the first sensor 11 and the second sensor 12, and the data errors 132a may include, for example, a conversion error.

In FIG. 2, after the processor 13 calculates the data errors 132a between the first sensor 11 and the second sensor 12, the processor 13 accumulates the number of the data errors 132a. When the number of the data errors 132a accumulated exceeds an error threshold, the processor 13 executes calibration data 133 to adjust the first sensing data 11a and the first sensing data 12a.

When the number of the data errors 132a exceeds the error threshold, the processor 13 executes the calibration data 133 according to the at least one piece of first valid data 131a and the at least one piece of second valid data 131b to calculate a calibration parameter 133a and a calibration parameter 133b, and adjusts the first sensing data 11a and the second sensing data 11b based on the calibration parameter 133a and the calibration parameter 133b.

In one embodiment, the processor 13 may calculate a calibration parameter in a statistical manner of a sampling distribution average according to the at least one piece of first valid data and the at least one piece of second valid data.

Figure 7:
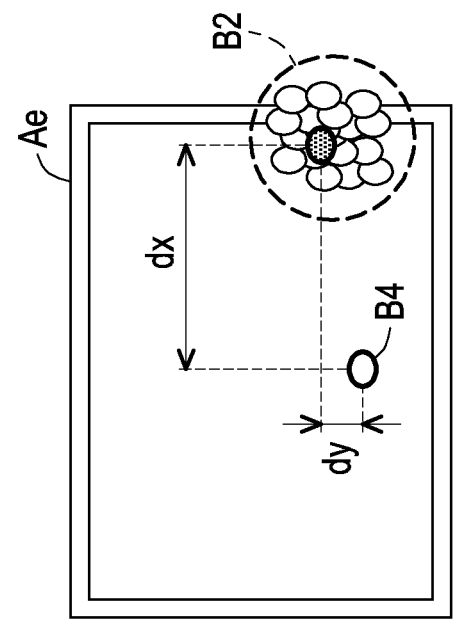
FIG. 7 is a schematic diagram illustrating a dynamic calibration system for heterogeneous sensors calculating a calibration parameter according to an embodiment of the disclosure.
Figure 7:
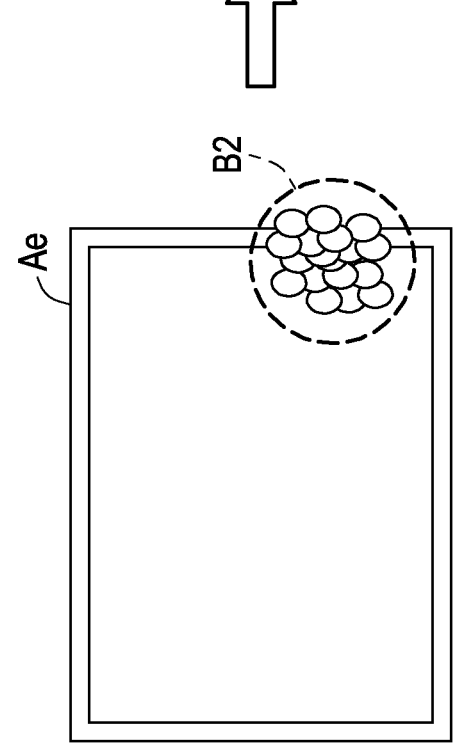

FIG. 7 is a schematic diagram illustrating a dynamic calibration system for heterogeneous sensors calculating a calibration parameter according to an embodiment of the disclosure. With reference to FIGS. 2 and 7 at the same time, the processor 13 performs statistics on the second valid data 131b corresponding to the valid sensing point B2 in a statistical manner of the sampling distribution average based on the first valid data 131a corresponding to the valid object frame Ae, and finds an ideal sensing point B4 by calculating adjustment values dx and dy. The processor 13 calculates the calibration parameter 133a and the calibration parameter 133b based on the adjustment values dx and dy, and adjusts the first sensing data 11a and the second sensing data 11b based on the calibration parameter 133a and the calibration parameter 133b. The processor 13 may convert the first sensing data 11a and the second sensing data 11b that are adjusted into an image signal, and transmits the image signal to the display 2. The image signal may display an image corresponding to the first sensing data 11a and the second sensing data 11b through the display 2 for users to watch.

Figure 8:
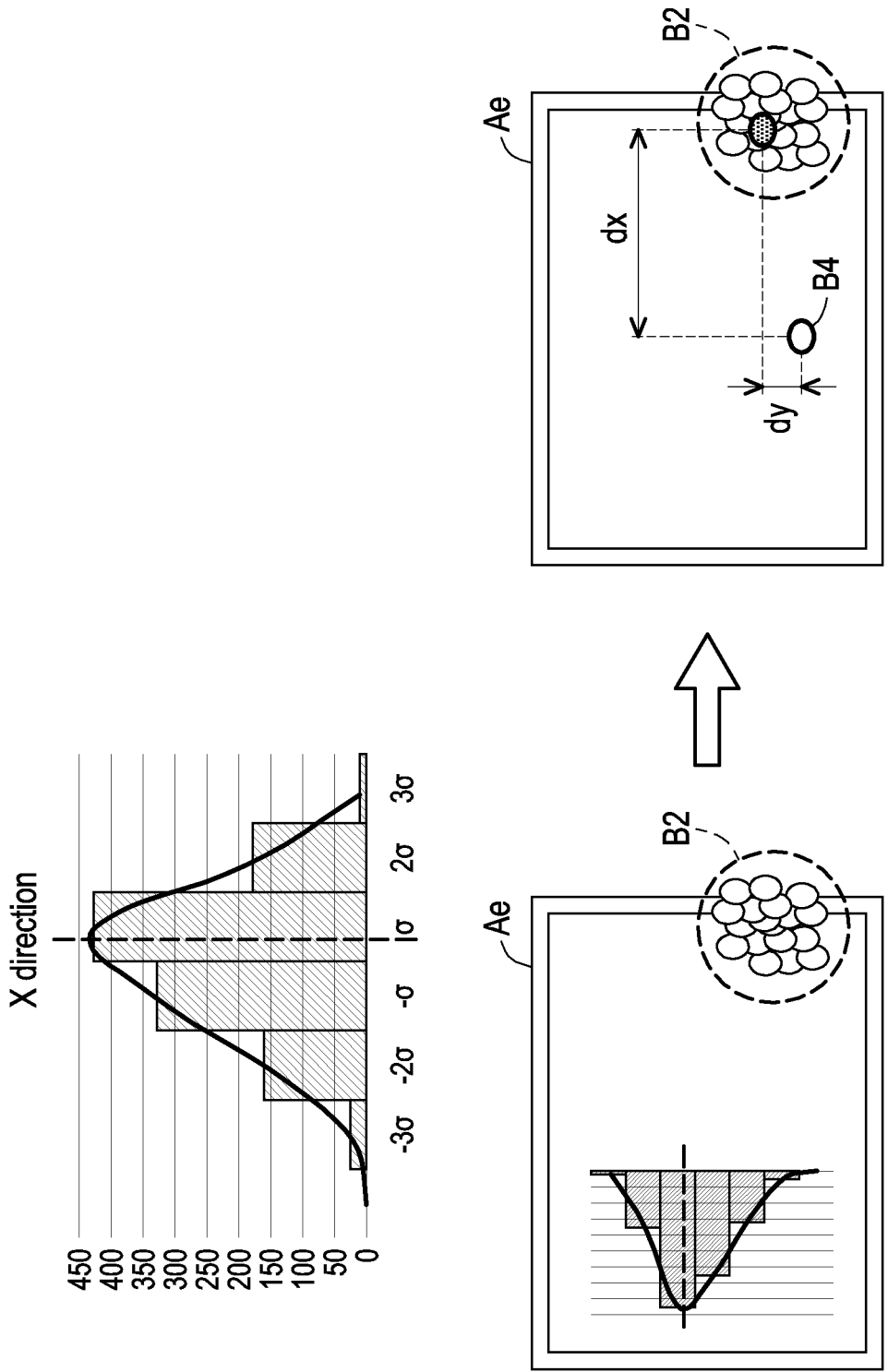
FIG. 8 is a schematic diagram illustrating a dynamic calibration system for heterogeneous sensors calculating a calibration parameter according to another embodiment of the disclosure.

In one embodiment, the processor 13 may calculate a calibration parameter in a statistical manner of a moving average according to the at least one piece of first valid data and the at least one piece of second valid data. FIG. 8 is a schematic diagram illustrating a dynamic calibration system for heterogeneous sensors calculating a calibration parameter according to another embodiment of the disclosure. With reference to FIGS. 2 and 8 at the same time, the processor 13 performs statistics on the second valid data 131b corresponding to the valid sensing point B2, in particular, the second valid data 131b distributed within 3-6, in a statistical manner of the sampling distribution average based on the first valid data 131a corresponding to the valid object frame Ae, and finds the ideal sensing point B4 by calculating the adjustment values dx and dy. The processor 13 calculates the calibration parameter 133a and the calibration parameter 133b based on the adjustment values dx and dy, and adjusts the first sensing data 11a and the second sensing data 11b based on the calibration parameter 133a and the calibration parameter 133b. The processor 13 converts the first sensing data 11a and the second sensing data 11b that are adjusted into an image signal, and transmits the image signal to the display 2. The image signal may display an image corresponding to the first sensing data 11a and the second sensing data 11b through the display 2 for users to watch.

Figure 9:
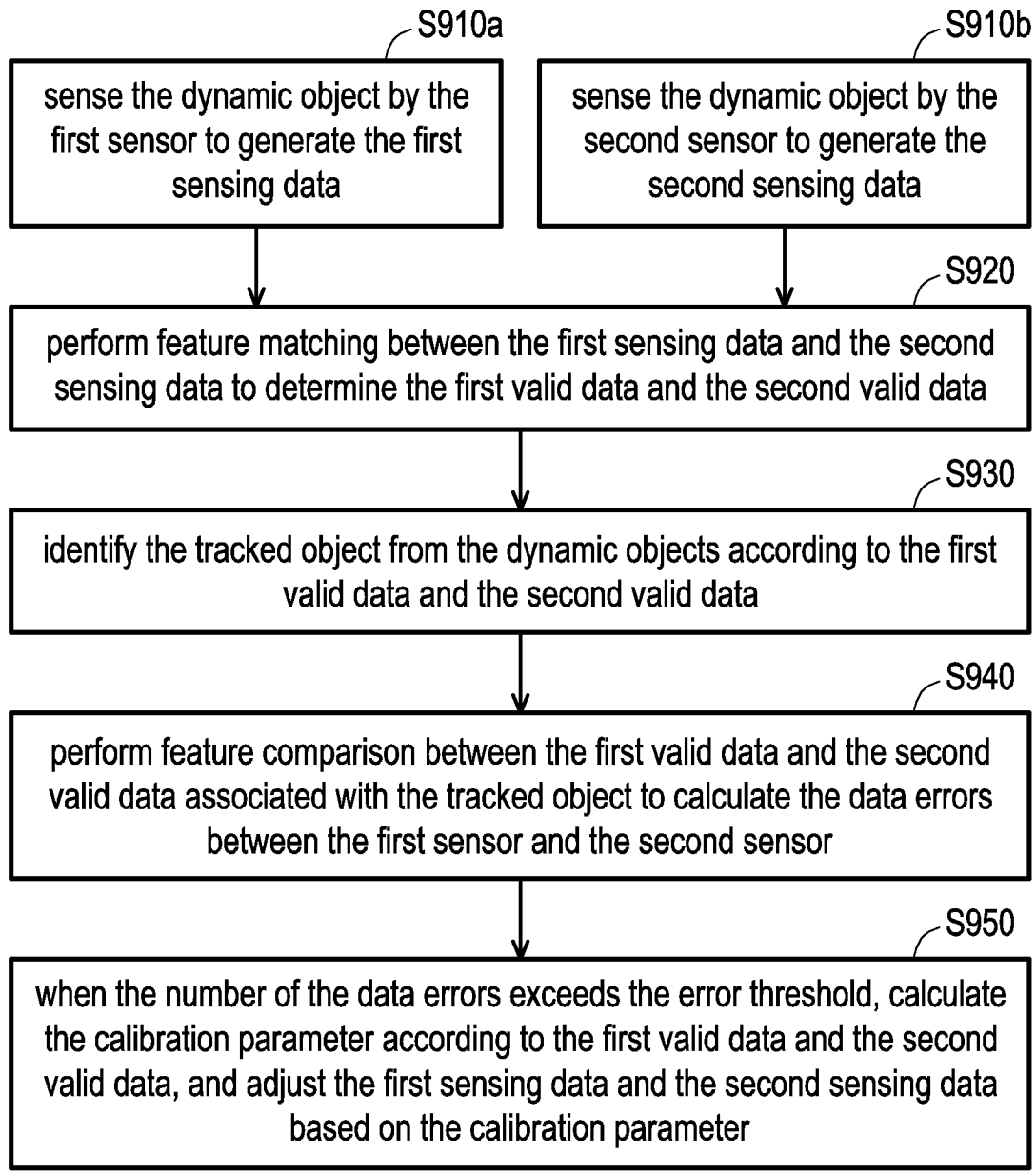
FIG. 9 is a flow chart illustrating a dynamic calibration method for heterogeneous sensors according to an embodiment of the disclosure.

FIG. 9 is a flow chart illustrating a dynamic calibration method 9 for heterogeneous sensors according to an embodiment of the disclosure. The dynamic calibration method 9 for heterogeneous sensors includes steps S910a, S910b and S920-S950. In the step S910a, at least one dynamic object is sensed by a first sensor to generate multiple pieces of first sensing data; in the step S910b, the at least one dynamic object is sensed by a second sensor to generate multiple pieces of second sensing data. It should be noted that the step S910a and the step S910b may be performed simultaneously.

In the step S920, feature matching is performed between the first sensing data and the second sensing data to determine at least one piece of first valid data and at least one piece of second valid data. In the step S930, a tracked object is identified from the at least one dynamic object according to the at least one piece of first valid data and the at least one piece of second valid data. In the step S940, feature comparison is performed between the at least one piece of first valid data and the at least one piece of second valid data associated with the tracked object to calculate data errors between the first sensor and the second sensor. In the step S950, when the number of the data errors exceeds an error threshold, a calibration parameter is calculated according to the at least one piece of first valid data and the at least one piece of second valid data, and the first sensing data and the second sensing data are adjusted based on the calibration parameter.

In one embodiment, the first sensor may be an image sensor, and the second sensor may be an optical sensor. The dynamic calibration method 9 for heterogeneous sensors further includes sensing multiple dynamic objects by the first sensor and obtaining at least one object frame of each of the multiple dynamic objects, simultaneously, sensing the multiple dynamic objects by the second sensor and obtaining at least one sensing point of each of the multiple dynamic objects, and generating multiple pieces of first sensing data corresponding to the at least one object frame of each of the multiple of dynamic objects and multiple pieces of second sensing data corresponding to the at least one sensing point of each of the multiple dynamic objects.

Next, a relative position the between the sensing points and the object frames is determined. When the at least one sensing point is located inside the object frame, the object frame is determined to be a valid object frame, and the at least one sensing point is determined to be a candidate sensing point. When the at least one sensing point is located inside the object frame, a distance between the candidate sensing point and the valid object frame is respectively calculated. The candidate sensing point corresponding to the minimum distance from the valid object frame is set as a valid sensing point. The first sensing data corresponding to the valid object frame are set as first valid data according to the valid object frame, and the second sensing data corresponding to the valid sensing point are set as second valid data according to the valid sensing point.

In one embodiment, the first sensor and the second sensor may both be an image sensor. The dynamic calibration method 9 for heterogeneous sensors further includes sensing the multiple dynamic objects by the first sensor and obtaining the at least one object frame of each of the multiple dynamic objects, simultaneously, sensing the dynamic objects by the second sensor and obtaining at least one second object frame of each of the multiple dynamic objects, and generating the multiple pieces of first sensing data corresponding to the at least one object frame of each of the multiple dynamic objects and the multiple pieces of second sensing data corresponding to the at least one second object frame of each of the multiple dynamic objects.

Next, a comparison algorithm is executed to compare similarity between the dynamic object in the at least one object frame and the dynamic object in the at least one second object frame. When the similarity is greater than a similarity threshold, it is determined that the dynamic object in the at least one object frame is the same as the dynamic object in the at least one second object frame. The first sensing data corresponding to the at least one object frame is set as first valid data, and the second sensing data corresponding to the at least one second object frame is set as second valid data according to the at least one second object frame.

In one embodiment, the dynamic calibration method 9 for heterogeneous sensors further includes setting the at least one object frame and the at least one second object frame to the same tracking number when the similarity is greater than the similarity threshold.

In one embodiment, a deep learning method or a singular value decomposition (SVD) method is adopted to perform the feature comparison between the at least one piece of first valid data and the at least one piece of second valid data associated with the tracked object.

In one embodiment, the at least one piece of first valid data and the at least one piece of second valid data are calculated in a statistical manner of a sampling distribution average or a moving average, and the calibration parameter is calculated.

To sum up, the dynamic calibration system for heterogeneous sensors and the dynamic calibration method for heterogeneous sensors described in this disclosure adjust sensing data in real time during driving when it is determined that at least one of the heterogeneous sensors has a deviation in sensitivity. When the sensor is inaccurate, the vehicle does not need to return to a repair shop for static calibration, which saves time, manpower, and maintenance costs, and improves the safety of the vehicle during driving.

What is claimed is:

1. A dynamic calibration system for heterogeneous sensors, comprising:
    a first sensor configured to sense at least one dynamic object to generate a plurality of pieces of first sensing data;
    a second sensor configured to sense the at least one dynamic object to generate a plurality of pieces of second sensing data; and
    a processor coupled to the first sensor and the second sensor to execute:
        perform feature matching between the first sensing data and the second sensing data to determine at least one piece of first valid data and at least one piece of second valid data, and identify a tracked object from the at least one dynamic object according to the at least one piece of first valid data and the at least one piece of second valid data;
        perform feature comparison between the at least one piece of first valid data and the at least one piece of second valid data associated with the tracked object to calculate data errors between the first sensor and the second sensor; and
        in response to the number of the data errors exceeding an error threshold, calculate a calibration parameter according to the at least one piece of first valid data and the at least one piece of second valid data, and adjust the first sensing data and the second sensing data based on the calibration parameter.

2. The dynamic calibration system for heterogeneous sensors according to claim 1, wherein the first sensor is an image sensor, and the first sensor is further configured to sense the at least one dynamic object and obtain at least one object frame of each of the at least one dynamic object, and generate the first sensing data corresponding to the at least one object frame of each of the at least one dynamic object.

3. The dynamic calibration system for heterogeneous sensors according to claim 2, wherein the second sensor is an optical sensor, and the second sensor is further configured to sense the at least one dynamic object and obtain at least one sensing point of each of the at least one dynamic object, and generate the second sensing data corresponding to the at least one sensing point of each of the at least one dynamic object.

4. The dynamic calibration system for heterogeneous sensors according to claim 3, wherein
    in response to the processor performing feature matching between the first sensing data and the second sensing data, the processor determines a relative position between at least one of the at least one sensing point and at least one of the at least one object frame; and in response to at least one of the at least one sensing point being located inside at least one of the at least one object frame, the processor determines that the at least one of the at least one object frame is a valid object frame, and determines that the at least one of the at least one sensing point is at least one candidate sensing point.

5. The dynamic calibration system for heterogeneous sensors according to claim 4, wherein in response to at least one of the at least one sensing point being located inside at least one of the at least one object frame, the processor respectively calculates a distance between the at least one candidate sensing point and the valid object frame;

the processor sets the candidate sensing point corresponding to a smallest distance as a valid sensing point; and the processor sets the first sensing data corresponding to the valid object frame as the at least one piece of first valid data according to the valid object frame, and sets the second sensing data corresponding to the valid sensing point as the at least one piece of second valid data according to the valid sensing point.

6. The dynamic calibration system for heterogeneous sensors according to claim 2, wherein the second sensor is an image sensor, and the second sensor is further configured to sense the at least one dynamic object and obtain at least one second object frame of each of the at least one dynamic object, and generate the second sensing data corresponding to the at least one second object frame of each of the at least one dynamic object.

7. The dynamic calibration system for heterogeneous sensors according to claim 6, wherein in response to the processor performing feature matching between the first sensing data and the second sensing data, the processor executes a comparison algorithm to compare a similarity between the dynamic object in the at least one object frame and the dynamic object in the at least one second object frame;

in response to the similarity being greater than a similarity threshold, the processor determines that the dynamic object in the at least one object frame is the same as the dynamic object in the at least one second object frame; and the processor sets the first sensing data corresponding to the at least one object frame as the at least one piece of first valid data according to the at least one object frame, and sets the second sensing data corresponding to the at least one second object frame as the at least one piece of second valid data according to the at least one second object frame.

8. The dynamic calibration system for heterogeneous sensors according to claim 7, wherein in response to the similarity being greater than the similarity threshold, the processor sets the at least one object frame and the at least one second object frame to the same tracking number.

9. The dynamic calibration system for heterogeneous sensors according to claim 1, wherein the processor adopts a deep learning method or a singular value decomposition (SVD) method to perform feature comparison between the at least one piece of first valid data and the at least one piece of second valid data associated with the tracked object.

10. The dynamic calibration system for heterogeneous sensors according to claim 1, wherein the processor performs statistics on the at least one piece of first valid data and the at least one piece of second valid data in a statistical manner of a sampling distribution average or a moving average, and calculates the calibration parameter.

11. A dynamic calibration method for heterogeneous sensors, comprising:

sensing at least one dynamic object by a first sensor to generate a plurality of pieces of first sensing data;

sensing the at least one dynamic object by a second sensor to generate a plurality of pieces of second sensing data;

performing feature matching between the first sensing data and the second sensing data to determine at least one piece of first valid data and at least one piece of second valid data, and identifying a tracked object from the at least one dynamic object according to the at least one piece of first valid data and the at least one piece of second valid data;

performing feature comparison between the at least one piece of first valid data and the at least one piece of second valid data associated with the tracked object to calculate data errors between the first sensor and the second sensor; and in response to the number of the data errors exceeding an error threshold, calculating a calibration parameter according to the at least one piece of first valid data and the at least one piece of second valid data, and adjusting the first sensing data and the second sensing data based on the calibration parameter.

12. The dynamic calibration method for heterogeneous sensors according to claim 11, wherein the first sensor is an image sensor, and the dynamic calibration method for heterogeneous sensors further comprises:

sensing the at least one dynamic object by the first sensor and obtaining at least one object frame of each of the at least one dynamic object, and generating the first sensing data corresponding to the at least one object frame of each of the at least one dynamic object.

13. The dynamic calibration method for heterogeneous sensors according to claim 12, wherein the second sensor is an optical sensor, and the dynamic calibration method for heterogeneous sensors further comprises:

sensing the at least one dynamic object by the second sensor and obtaining at least one sensing point of each of the at least one dynamic object, and generating the second sensing data corresponding to the at least one sensing point of each of the at least one dynamic object.

14. The dynamic calibration method for heterogeneous sensors according to claim 13, wherein performing feature matching between the first sensing data and the second sending data further comprises:

determining a relative position between at least one of the at least one sensing point and at least one of the at least one object frame; and in response to at least one of the at least one sensing point being located inside at least one of the at least one object frame, determining that the at least one of the at least one object frame is a valid object frame, and determining that the at least one of the at least one sensing point is at least one candidate sensing point.

15. The dynamic calibration method for heterogeneous sensors according to claim 14, further comprising:

in response to at least one of the at least one sensing point being located inside at least one of the at least one object frame, respectively calculating a distance between the at least one candidate sensing point and the valid object frame;

setting the candidate sensing point corresponding to a smallest distance as a valid sensing point; and setting the first sensing data corresponding to the valid object frame as the at least one piece of first valid data according to the valid object frame, and setting the second sensing data corresponding to the valid sensing point as the at least one piece of second valid data according to the valid sensing point.

16. The dynamic calibration method for heterogeneous sensors according to claim 12, wherein the second sensor is an image sensor, and the dynamic calibration method for heterogeneous sensors further comprises:

sensing the at least one dynamic object by the second sensor and obtaining at least one second object frame of each of the at least one dynamic object, and generating the second sensing data corresponding to the at least one second object frame of each of the at least one dynamic object.

17. The dynamic calibration method for heterogeneous sensors according to claim 16, wherein performing feature matching between the first sensing data and the second sensing data further comprises:

executing a comparison algorithm to compare a similarity between the dynamic object in the at least one object frame and the dynamic object in the at least one second object frame;

in response to the similarity being greater than a similarity threshold, determining that the dynamic object in the at least one object frame is the same as the dynamic object in the at least one second object frame; and setting the first sensing data corresponding to the at least one object frame as the at least one piece of first valid data according to the at least one object frame, and setting the second sensing data corresponding to the at least one second object frame as the at least one piece of second valid data according to the at least one second object frame.

18. The dynamic calibration method for heterogeneous sensors according to claim 17, further comprising:

in response to the similarity being greater than the similarity threshold, setting the at least one object frame and the at least one second object frame to the same tracking number.

19. The dynamic calibration method for heterogeneous sensors according to claim 11, wherein performing feature comparison between the at least one piece of first valid data and the at least one piece of second valid data associated with the tracked object further comprises:

adopting a deep learning method or a singular value decomposition (SVD) method to perform feature comparison between the at least one piece of first valid data and the at least one piece of second valid data associated with the tracked object.

20. The dynamic calibration method for heterogeneous sensors according to claim 11, wherein calculating the calibration parameter according to the at least one piece of first valid data and the at least one piece of second valid data further comprises:

performing statistics on the at least one piece of first valid data and the at least one piece of second valid data in a statistical manner of a sampling distribution average or a moving average, and calculating the calibration parameter.

* * * * *